United States Patent
Searfoss

(10) Patent No.: US 8,608,224 B2
(45) Date of Patent: Dec. 17, 2013

(54) HYDRAULIC BRAKE MOTOR ASSEMBLY FOR TRUCK COVER SYSTEM

(71) Applicant: Timothy K Searfoss, West Branch, MI (US)

(72) Inventor: Timothy K Searfoss, West Branch, MI (US)

(73) Assignee: Roll-Rite, LLC, Alger, MI (US)

( * ) Notice: Subject to any disclaimer, the term of this patent is extended or adjusted under 35 U.S.C. 154(b) by 0 days.

(21) Appl. No.: 13/653,643

(22) Filed: Oct. 17, 2012

(65) Prior Publication Data

US 2013/0036936 A1 Feb. 14, 2013

Related U.S. Application Data

(63) Continuation-in-part of application No. 13/007,819, filed on Jan. 17, 2011.

(51) Int. Cl.
*B60P 7/04* (2006.01)

(52) U.S. Cl.
USPC ........................................ 296/98; 105/377.02

(58) Field of Classification Search
USPC ........ 296/98; 310/76, 77; 105/377.02, 377.11
IPC ....................................................... B60P 7/04
See application file for complete search history.

(56) References Cited

U.S. PATENT DOCUMENTS

| 5,829,819 | A | * | 11/1998 | Searfoss | 296/98 |
| 6,695,383 | B2 | * | 2/2004 | Wood | 296/98 |
| 7,025,401 | B2 | * | 4/2006 | Martinson et al. | 296/98 |
| 7,370,904 | B2 | * | 5/2008 | Wood et al. | 296/98 |
| 2012/0080968 | A1 | | 4/2012 | Knight et al. | |

* cited by examiner

*Primary Examiner* — Glenn Dayoan
*Assistant Examiner* — Pinel Romain
(74) *Attorney, Agent, or Firm* — Miller Canfield Paddock & Stone PLC; Timothy J. Engling

(57) ABSTRACT

A hydraulic brake gear motor with a brake mechanism to operate a roll tarp for use with an open top container. A motor-driven rollable cover is attached to and wrappable about a reel to selectively cover contents of the container. The hydraulic gear motor operates with a brake mechanism to lock and hold a position of the motor. A secondary brake mechanism may include a hydraulic piston that selectively engages a holding brake with a hex connector. A hydraulic motor may include a port path for flow of fluid to internal meshing gears and a braking mechanism with a plunger that clamps and holds the meshing gears when hydraulic fluid is not flowing. A transmission having rolling gears can be operated by the hydraulic motor with such brake mechanisms. The motor and brake mechanisms are preferably hydraulically operated with an existing system of a trailer or rail car.

11 Claims, 8 Drawing Sheets

HYDRAULIC BRAKE MOTOR ASSEMBLY FOR TRUCK COVER SYSTEM

CROSS-REFERENCE TO RELATED APPLICATION

This application is a continuation-in-part application of U.S. patent application Ser. No. 13/007,819, filed Jan. 17, 2011.

FIELD OF THE DISCLOSURE

This disclosure relates to a hydraulic driven gear motor with a secondary holding device, such as for tarp systems for trailers or railcars. More specifically, the disclosure relates to hydraulic brake motors used with a transmission having high efficiency gears that are not self-braking.

BACKGROUND

Trucks and cabs pull trailers that often have tarp systems. Similarly, rail cars may have open top container cars for which tarp systems may be used. Tarps are known for covering contents of a container of the trailers and railcars during transport. Roll tarps often include a tarp attached on an axle, reel or roller and to a side of a container. Tarp systems are automated to cover trailers while transporting contents of the container. But size limitations, weight limits, efficiency, and output of motor and transmission must be maximized for tarp systems.

Apparatus have been devised for covering a truck load. Some such apparatus include an electric motor for selectively winding a flexible cover. U.S. Pat. No. 5,031,955 provides a truck cover that may be motor-operated from the cab of a truck to extend the cover from a winding assembly proximate the front of the truck bed and forward the rear of the truck bed. It discloses a direct drive spool winding system with an automatic self-brake feature with the 90 degree relationship of the worm gear with respect to the drive bolt threads.

Automated systems that cover the truck bed from side to side are known. For instance, U.S. Pat. No. 5,328,228 shows a cover for truck bed and cargo. Similarly, U.S. Pat. No. 5,924,758 shows a roll assist mechanism for tarp systems. U.S. Pat. No. 6,206,449, the disclosure of which is hereby incorporated by reference, shows a side-to-side truck cover system including a pair of arms, each of which includes a base and an extension.

Later Roll-Rite patents protect other aspects of a motor and knuckle arm assembly to unroll to open and to roll to close the tarp to uncover and cover the contents of a container of a truck or trailer.

U.S. Pat. Nos. 7,726,720 and 6,916,060 show a motor 30 mounted on the distal end of the extension 18. A rotatable reel 32 extends from the motor 30, and that is operatively connected to one end of the cover 12 so as to function as a take-up spool. The motor 30 is preferably provided with a brake, which allows, among other things, for the apparatus 10 to remain in the stowed or uncovered position. When the brake is released, the base 14 swings toward a side of the trailer or truck bed. The motor 30 may be powered, from within or without the cab of the truck, to facilitate operation. Further details of one embodiment of the motor are taught by U.S. Pat. No. 5,829,819, which is hereby incorporated by reference. In this way, the cover 12 is pulled off of the reel 32 and extended over the trailer or truck bed. The motor 30 can be reversed to drive the reel 32 and retract the cover 12 against the tension force of the springs to uncover the load bed.

U.S. Pat. No. 5,829,819 discloses a direct-drive actuator assembly that actuates a tarp spool for a truck bed tarp system. The direct-drive actuator assembly includes a transmission housing adapted for mounting to the tarp housing. An output shaft extends from the transmission housing for driving the tarp spool. An input shaft is also positioned at least partially within the transmission housing. An electric motor is operatively connected to the input shaft for actuating the tarp spool. The spur gear arrangement is not self-braking so a brake arrangement is used with the DC motor. A brake, such as a spring-loaded, power release type, is operatively connected to the electric motor for automatically braking the motor when the electric motor is turned off. A cover is provided for enclosing the stacked brake and electric motor against the transmission housing.

Automatic motor-operated solutions for tarp operation are known in the art. Electric motors are used with worm gears for roll tarp systems. In typical powered tarp systems, an electric motor may be used in conjunction with worm gears, which can be self-braking. Worm gears are inefficient. U.S. Pat. No. 5,829,819 discloses a series of rotatable transmission spur gears in a system with a secondary brake.

Trucks and trailers often have hydraulic systems to operate hydraulic components or other systems of the truck or trailer. Hydraulic systems have not been integrated with motors for roll tarp systems.

A higher efficiency, enhanced powered system in a compact, lightweight package is desirable.

SUMMARY

The present disclosure provides hydraulic driven gear motors with a secondary holding device. This system is well suited for a roll tarp system with a motor and transmission combination enhanced for certain uses, but may include some conventional components, such as a knuckle arm assembly, to help operate the tarp system. This system can also be used in operating hopper doors.

Both electric and hydraulic driven gear motors need to have a holding device, such as a brake mechanism, with high efficiency spur gears in the transmission. Currently, drives may have worm gears, which are self-braking so an ordinary motor would run them. Using high efficiency gears, such as spur gears, can get more power output without making them extremely large, heavy, and expensive. The spur gear system does not require bleeding of oil or extensive efforts to enhance lubricity. A good worm gear set (such as with teeth cut on an angle to connect non-parallel shafts) may be 30% efficient, compared to a spur gear set (as a toothed wheel with radial teeth parallel to the axis) at 99% efficiency. The spur gear set is not self braking, so a holding device to lock and hold the motor position is required. The system thus needs a secondary brake or stop.

An independent brake mechanism allows a transmission system to use spur gears. The disclosed system is not limited by the type of brake mechanism. A mechanical holding device is an option, such as a hexagon mechanical brake in a receiver with a hex connector that can lock and hold the motor position. The holding device mechanism is also preferably hydraulic.

A hydraulic gear motor may include a port path for flow of fluid to an internal meshing gear set. The system may include a first gear on a primary rotating shaft and a second gear on a secondary shaft, with the primary rotating shaft extending from the hydraulic motor.

A brake mechanism can lock and hold a position of the hydraulic gear motor with a plunger that clamps and holds the internal meshing gears when hydraulic fluid is not flowing through the port path. A disk spring is also preferably used to engage the piston to compress when fluid is flowing so the plunger does not engage the gear set.

The disclosed systems substitute a hydraulic brake gear motor for an existing electric motor. The hydraulic brake motor can operate using existing hydraulics of the truck or trailer etc. The hydraulic system of the truck or trailer can effectively operate the hydraulic motor and a brake mechanism. With a small size, the hydraulic brake motor is adapted to be used with an efficient transmission, such as spur gear systems, with suitable characteristics for a roll tarp or hopper doors.

The combination of the hydraulic brake motor and the transmission provides a high efficiency, higher output power in a small, light package. The system is compact and light, but is also highly efficient with enhanced power output.

BRIEF DESCRIPTION OF THE DRAWINGS

The above-mentioned and other features of this disclosure and the manner of obtaining them will become more apparent, and the disclosure itself will be best understood by reference to the following descriptions of systems taken in conjunction with the accompanying figures, which are given as non-limiting examples only, in which.

The exemplifications set out herein illustrate embodiments of the disclosure that are not to be construed as limiting the scope of the disclosure in any manner. Additional features of the present disclosure will become apparent to those skilled in the art upon consideration of the following detailed description of illustrative embodiments exemplifying the best mode of carrying out the disclosure as presently perceived.

DETAILED DESCRIPTION

While the present disclosure may be susceptible to embodiments in different forms, the figures show, and herein described in detail, embodiments with the understanding that the present descriptions are to be considered exemplifications of the principles of the disclosure and are not intended to be exhaustive or to limit the disclosure to the details of construction and the arrangements of components set forth in the following description or shown in the figures.

Figure 1:
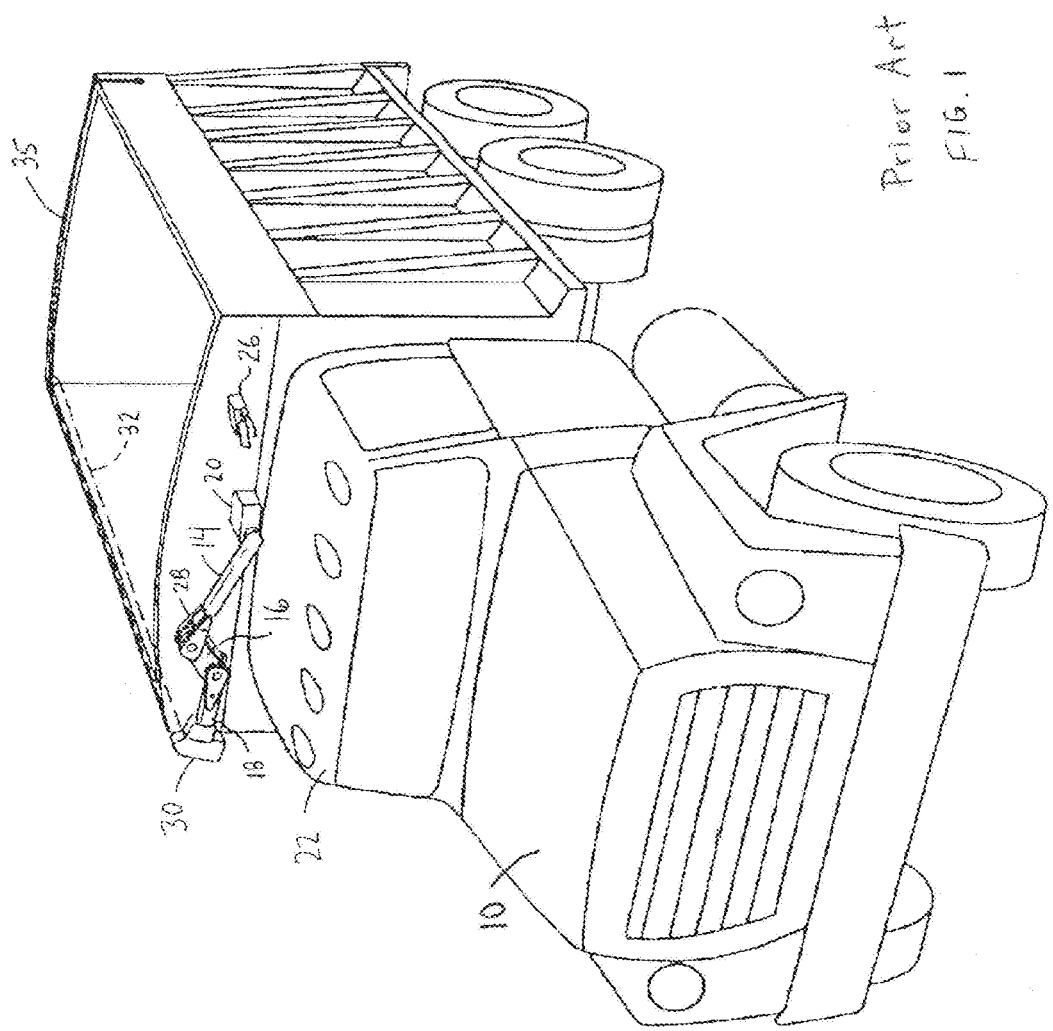
FIG. 1 shows a prior art system from U.S. Pat. No. 6,916,060.
Figure 2:
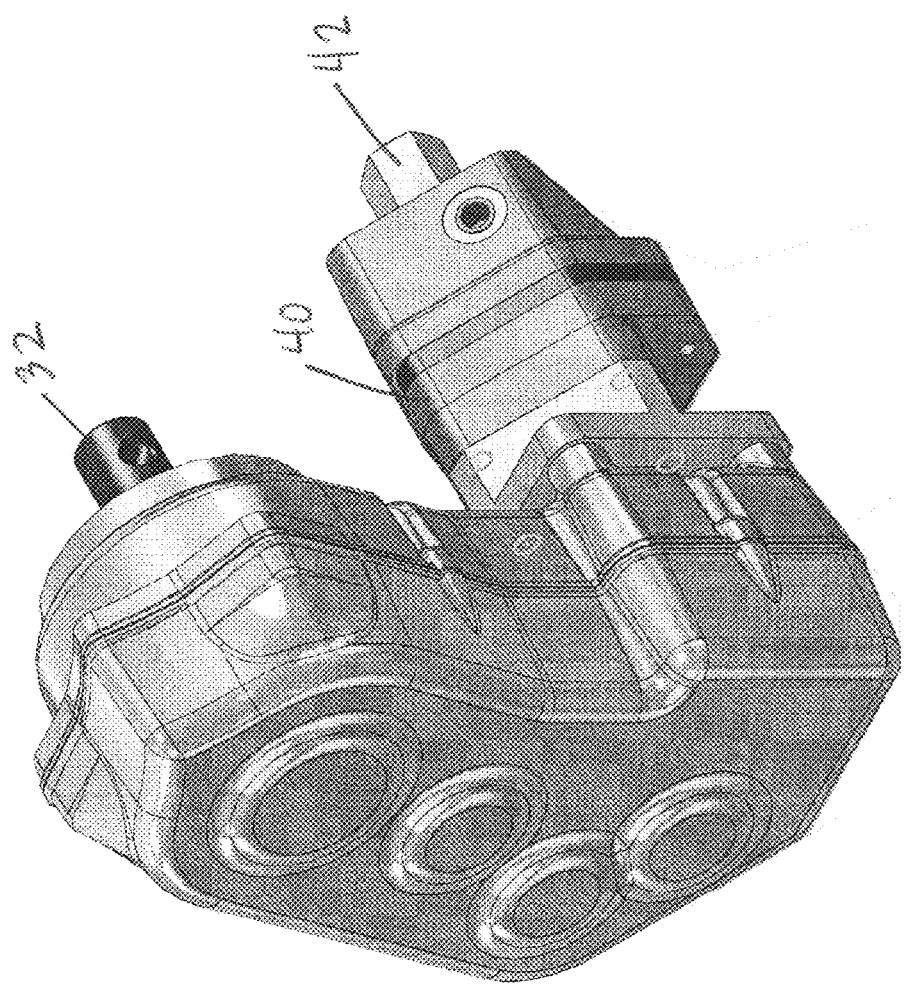
FIG. 2 shows a perspective view of a transmission housing, an output to reel, a motor and a brake mechanism.

FIG. 1 shows a conventional truck 10 with a prior art tarp system with an arm assembly comprising a base 14, an intermediate segment 16 and an extension 18 for a flexible tarp or cover of a truck. The tarp as shown should be wound or wrapped on a reel 32 in an uncovered position. The base 14 is mounted to the truck 10 at a base plate 20 proximate a top of a cab 22 of the truck 10. A motor 30 is mounted on the distal end of the extension 18. The rotatable reel 32 extends from the motor 30, and is operatively connected to one end of the cover so as to function as a take-up spool. The other end of the cover can be fixed at one or more points along a line below the top of one side of the truck 10. The prior art motor 30 is preferably provided with a brake that allows, among other things, for the apparatus to remain in the uncovered position shown in FIG. 1. When the brake is released, the base 14 swings toward the right side of the truck bed until it engages the stop 26. The motor 30 may be powered, from within or out of the cab of the truck 10, to facilitate this operation. This is one example of a side-to-side tarp system compatible with the present enhancements.

This system is well suited for a roll tarp system with an improved motor and transmission combination of a rollable cover for use with an open top container of a trailer or rail car.

The presently disclosed motor 40 is a hydraulic motor with a separate brake mechanism 42 that collectively operate with an different transmission 44 used with a reel 32 (or similar axle shaft for a tarp) as part of a tarp system. The system is design to brake, lock and hold the position of the motor 40 when not operating. A hydraulic driven gear motor 40 is preferably mounted on a distal end of an arm assembly for a side-to-side tarp system or a headboard of a container.

Motor

The hydraulic motor 40 may have a drive shaft 46 as input to the transmission 44. A motor-driven shaft 46 may extend from the motor 40 into the transmission 44. The hydraulic motor 40 drives the shaft 46 for driving transmission gears 48 and 50 and the output shaft 32 for moving, such as rolling, a cover, such as a tarp. The hydraulic motor 40 may weigh less than ten pounds, and preferably less than four pounds including the brake mechanism 42.

A hydraulic brake gear motor does not require electric power. The hydraulic motor 40 is preferably bi-directional. The hydraulic brake motor 40 can operate using existing hydraulics of the truck or trailer etc. The hydraulic system of the truck or trailer can operate the hydraulic motor 40 and brake mechanism 42.

The hydraulic motor 40 needs to have a brake mechanism 42 in conjunction with high efficiency gears 48 and 50, such as spur gears (including helical gears), in the transmission 44. Not being self-braking, an ordinary motor would not properly run the transmission 44 so a secondary brake mechanism 42 is required to lock and hold the motor position.

With a small size, the hydraulic motor 40 is adapted to be used with an enhanced transmission 44, such as spur gear systems, with suitable characteristics for a roll tarp. The transmission 44 uses high efficiency gears, such as spur gears, to get more power output without making the gears extremely large, heavy, and expensive.

Brake Mechanism

Not being self-braking, the brake mechanism 42 is used in conjunction with the hydraulic motor 40 for automatic braking to lock and hold a position of the motor 40.

A preferred brake mechanism 42 is a mechanical holding brake, such as shown with a hexagon mechanical brake 52 in a receiver 54 with a hex connector 56 that can lock and hold the motor position. As such, a hex connector 56 can mechanically lock and hold the motor position and the corresponding gears. i.e. 48 and 50, and thus the reel 32 operating a roll cover. The hex connector 56 secures in a receiver 54, such as a recess as a female hex, to prevent rotation of the drive shaft

46. Further, a resilient spring 58 can be applied on the brake 52 as a spring-applied brake that may be overcome with a hydraulic piston 60.

The brake mechanism 42 may include a hydraulic piston 60 that selectively engages a holding brake 52 with a hex connector 56 that mechanically cooperates with a receiver 54 in the drive shaft 46 to lock and hold the position of the hydraulic driven gear motor 40.

The brake mechanism 42 can be a spring-applied, hydraulic-released brake to facilitate automatic locking of the hydraulic motor 40. The brake mechanism 42 can also preferably be hydraulically operated in conjunction with the hydraulic motor 40.

The hydraulics can be used to operate the hydraulic motor 40 and can simultaneously disengage a hydraulic piston 60 to disengage a holding brake. The brake 52 automatically brakes the hydraulic motor 40 when the hydraulics are not operating the motor 40.

When the hydraulic motor 40 is not energized, the spring 58 causes the hex connector 56 to engage the drive shaft 46 to lock the drive shaft from rotating. When the hydraulic motor 40 is engaged, the hydraulic piston 60 is also engaged keeping the hex connector 56 disassociated with the drive shaft 46 by overcoming the spring force.

In operation, the motor 40 stops when a control valve is closed, which stops the motor 40, and then the engaging parts, such as 54 and 56, engage. A male hex connector 56 slides into a receiver 54, such as female hex, thus preventing the motor from turning until the male hex connector 56 is disengaged.

The system is not limited by the type of brake mechanism. U.S. Pat. No. 5,829,819 discloses a friction brake with a friction disc to lock a hub and accordingly preventing rotation of a drive shaft. This could be an alternative to a mechanical lock and hold brake.

Transmission

The hydraulic motor 40 is used in conjunction with rolling gears 50, preferably a spur gear set. The drive shaft 46 rotatably drives transmission gears 50. A spur gear has a cylinder or disk with the teeth projecting radially with the edge of the teeth straight and aligned parallel to the axis of rotation. These gears can be meshed together when they are fitted to parallel axles. Tooth contact is primarily rolling with sliding occurring during engagement and disengagement. This may be 99% efficient.

Figure 3:
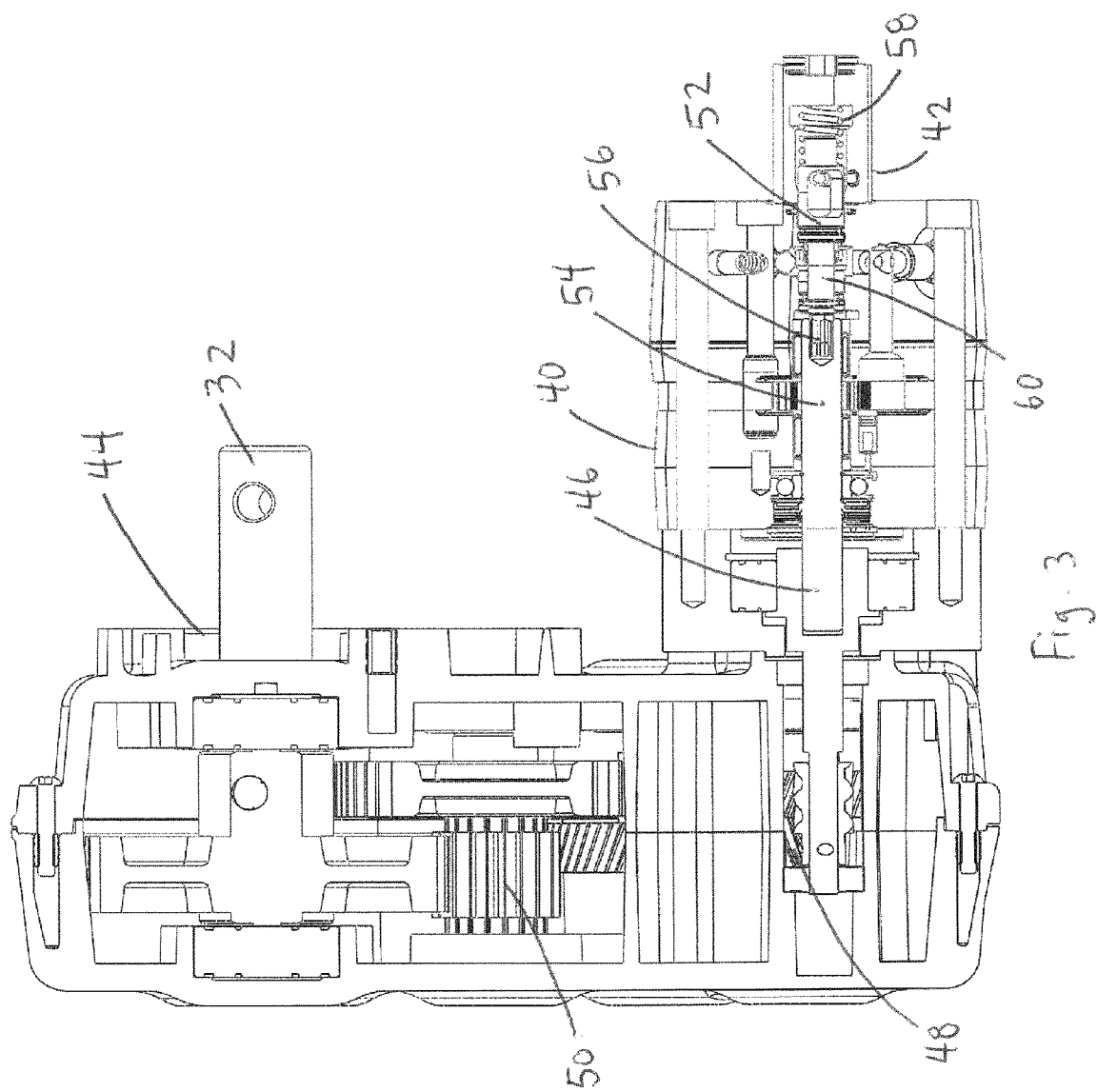
FIG. 3 shows a partial cut-away view of a hydraulic motor with a brake mechanism with a transmission for operating a tarp.
Figure 4:
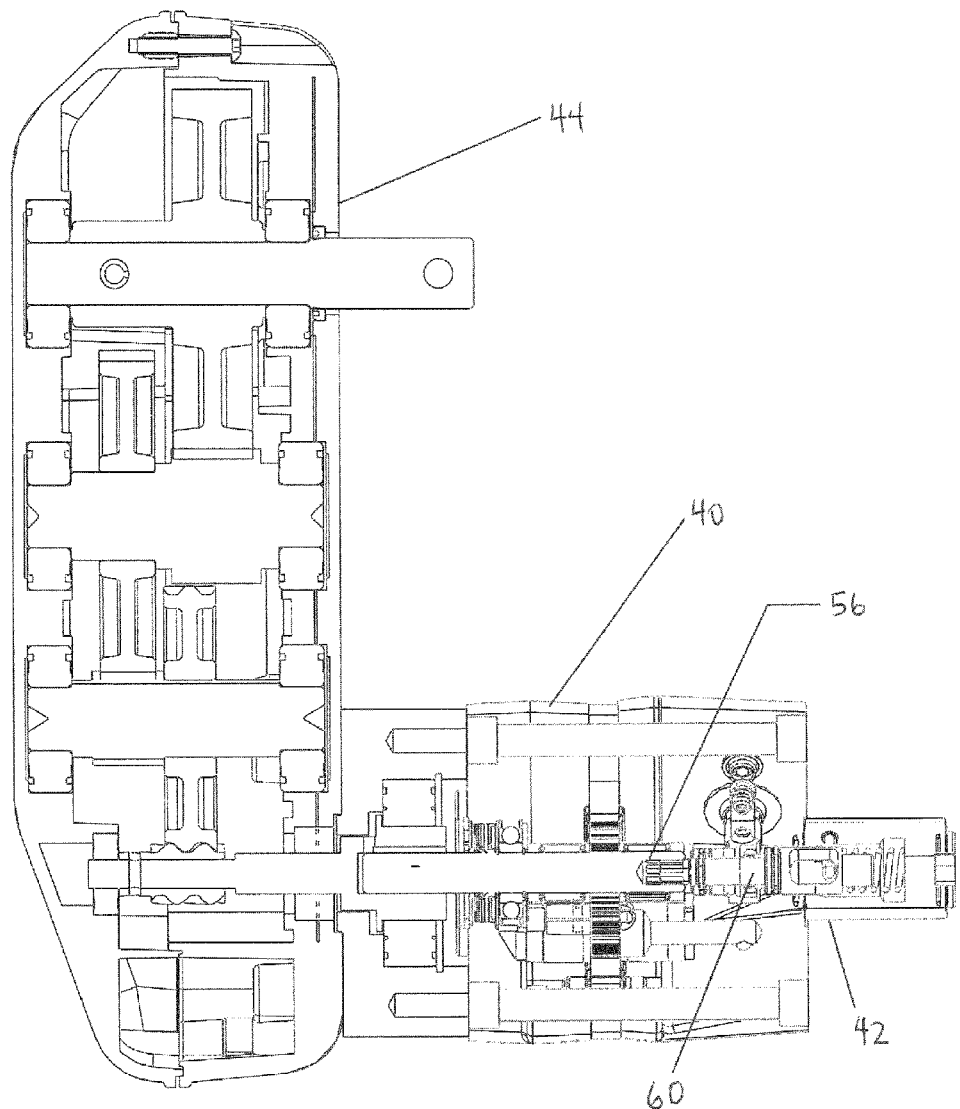
FIG. 4 shows a motor with a different transmission.
Figure 5:
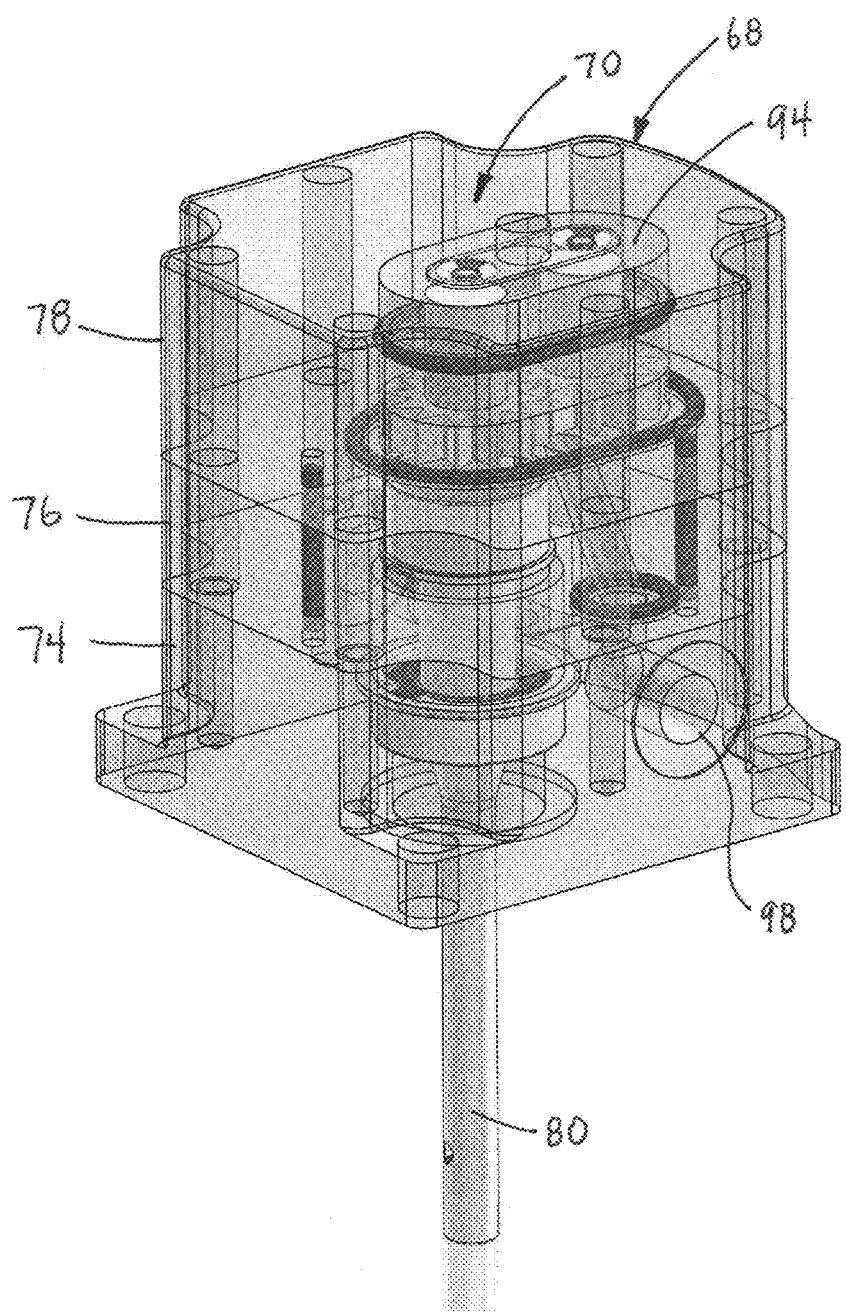
FIG. 5 shows a perspective transparent quarter view of another embodiment of a hydraulic brake motor system with a plunger on an internal gear set.

The multiple gears allow the size and weight of the transmission to be minimized. For example, the transmission in FIG. 3 has eight gears and the transmission in FIG. 4 has six gears in a confined space.

The output shaft 32 may extend from the transmission to directly drive a reel, axle or roller to operate a roll tarp.

Internal Gear Set with Clamping Plunger Brake

A hydraulic motor 68 can be locked in place so it cannot rotate with a spring-loaded piston that clamps on the gear set 72. This system is somewhat a combination between a normal motor and a pressure balanced motor. When hydraulic pressure is sent to the motor 68, that pressure pushes on the gear side of the piston, compressing the springs allowing the gears to spin.

As shown in FIGS. 5 through 8, a hydraulic motor 68 with the braking system 70 has an internal gear set 72 and may include a base section 74, which may include a motor mounting flange; a middle section 76 of the hydraulic motor case; and a top section 78 of the hydraulic motor case, which may be a cover. A primary rotating shaft 80 extends from the base section 74 and passes through a center aperture 82 in the middle section 76 and a center hole 84 in the base section 74.

The center aperture 82 and the center hole 84 can be different sizes to accommodate a tapered shaft 80 or otherwise accommodate one or more bearing 86. As such, the primary rotating shaft 80 can be sealed and mounted more efficiently. The primary rotating shaft 80 with its gear 88 provides the working parts for the hydraulic motor 68.

Figure 7:
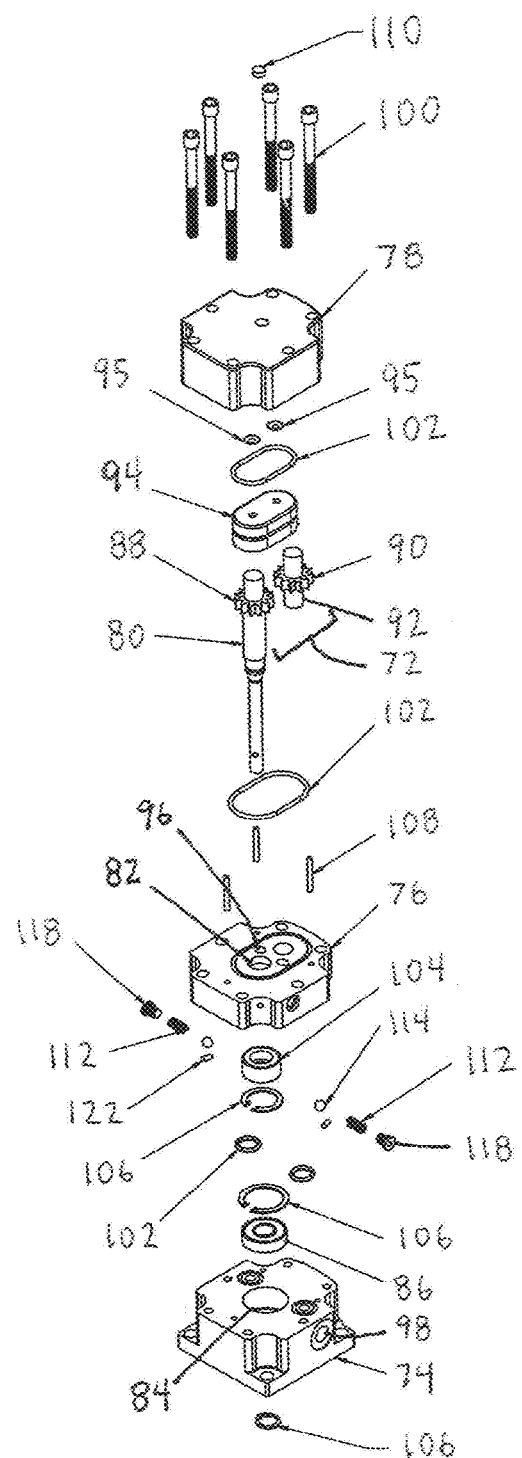
FIG. 7 shows an exploded view of the hydraulic system of FIG. 5.

The primary rotating shaft 80 has a gear 88 that preferably meshes with a second gear 90 surrounding a second rotatable shaft 92, which is preferably shorter as a short gear assembly for the hydraulic motor 68, as shown in FIG. 7. The second rotatable shaft 92 is aligned with the primary rotating shaft 80. The second rotatable shaft 92 is preferably between the top section 78 and middle section 76, which may include a receptacle for securing an end of the second rotatable shaft 92. The gears 88 and 90 transmit movement, motion or torque by means of direct contact between teeth of the gears 88 and 90. With the flow of hydraulic fluid through the port path 96, the gears 88 and 90 can rotate to provide torque to roll or unroll a tarp as an example.

A plunger 94 for the hydraulic motor 68 can be used with a spring 95, such as a Belleville, disk, or cup spring. A disk spring is shown to engage the plunger 94 that slides within a tubular recess in the top section 78, where the recess corresponds to the plunger shape. The plunger 94 operates as a sliding piston moved by fluid pressure to either allow movement of the gear set 72 or to clamp and hold the gear set 72. The primary purpose of the plunger 94 is to clamp the gear set 72 to prevent rotation when not desired. When pressure is applied to the gear set 72, the pressure also pushes on the plunger 94 compressing the spring 95, thus allowing the gear set 72 to rotate freely with the flow of fluid, such as hydraulic fluid. Otherwise, the gears 88 and 90 are held in place by the plunger 94 when hydraulic fluid is not flowing or pressurized within the hydraulic motor 68.

The clamping piston may only move a small amount, such as about 0.002". The spring disk 95 provides resilient engagement with the plunger 94 to allow for some movement.

Figure 6:
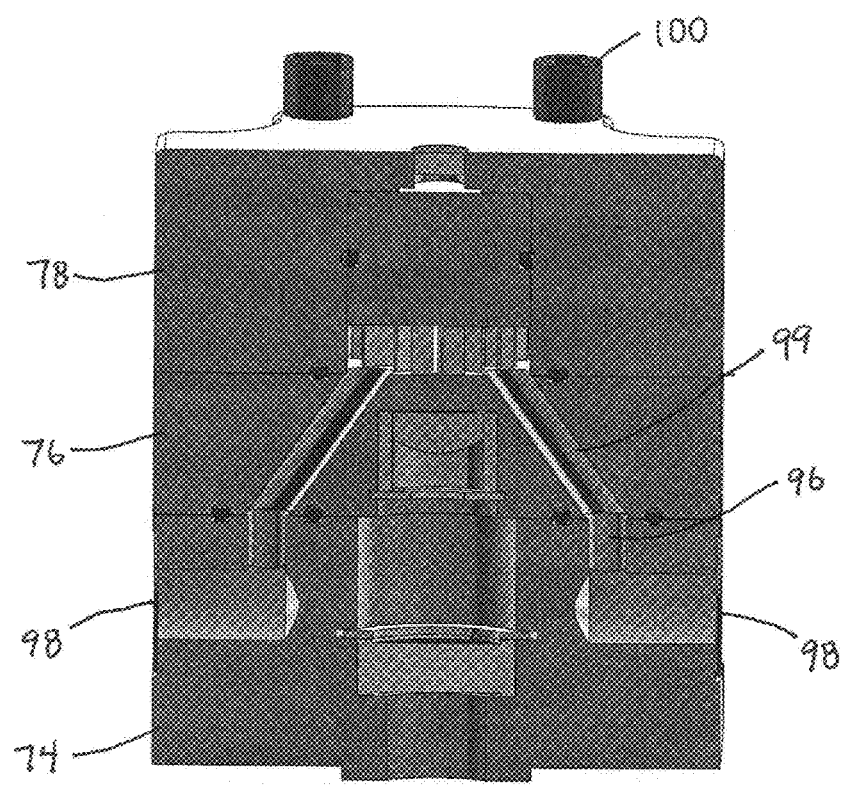
FIG. 6 shows a cut away view of a port path of the hydraulic system.

As shown in FIG. 6, a port path 96 may include ports 98 in the base section 74 with angled passageways 99 passing through the middle section 76 to the gear set 72. The passageways 99 preferably allow fluid to enter and exit adjacent to the intersection of meshing gears 88 and 90. The flow and pressure of fluid in the port path 96 helps dictate whether the gears 88 and 90 will rotate freely or will be clamped by the plunger 94.

FIG. 7 shows an exploded view of the hydraulic motor 68 with a braking system 70 having fasteners 100, such as Allen head bolts, and various sealing rings 102, such as O-rings, and oil seals 104 used with snap-rings 106, with two internal and one external snap-rings as shown. Also, internal dowels 108 can be used in the hydraulic motor 68. Finally, a breather element 110 can be used at the top of the hydraulic motor 68.

As further shown in expanded FIG. 7, a resilient spring 112 can be used with a check ball 114 to control pressure on the output shaft seal. Further, a resilient spring 112 can be used with a plug 118 and a press plug 122 on each side of the middle section 76.

Figure 8:
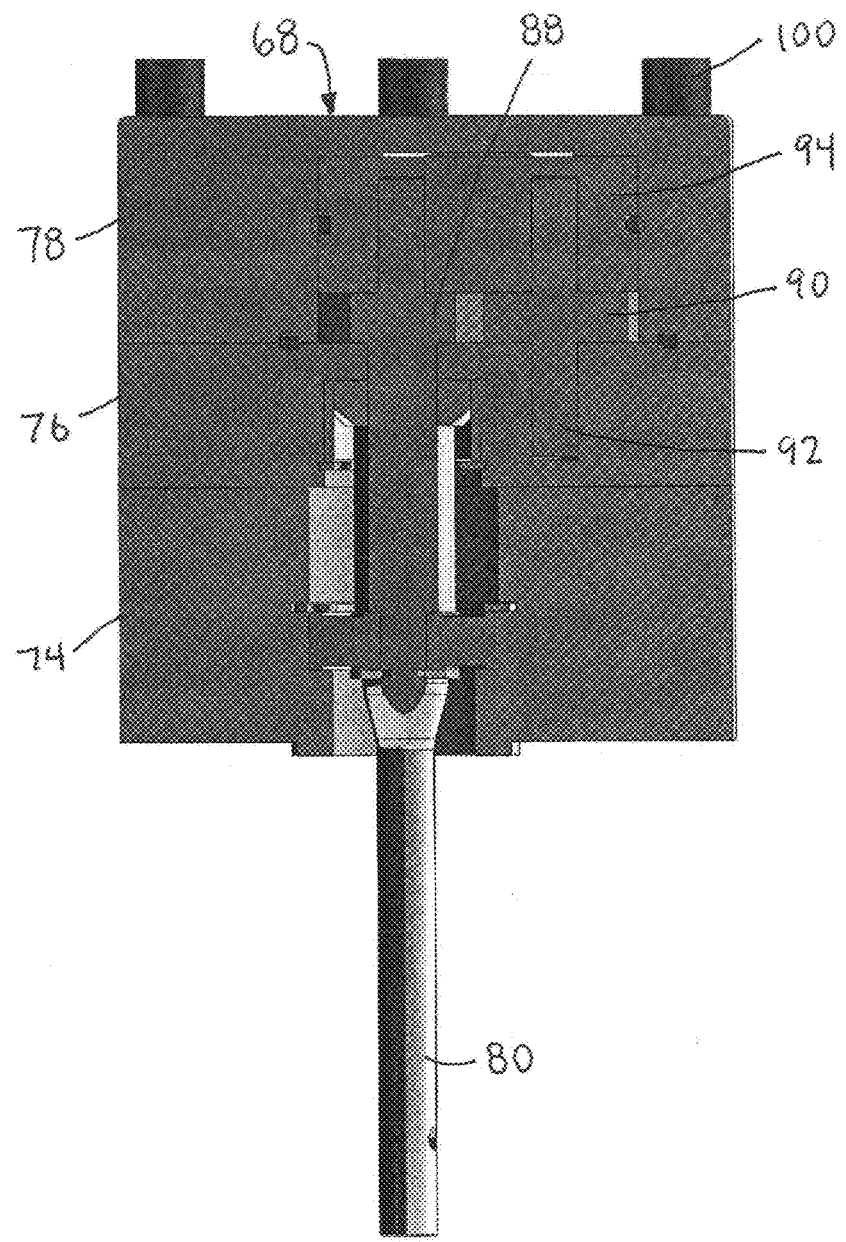
FIG. 8 shows a right cut-away view of the hydraulic system of FIG. 5 with both internal meshing gears on aligned rotating shafts and a plunger.

FIG. 8 shows a right cut-away view of the braking system 70 with both internal meshing gears 88 and 90 on aligned rotating shafts 80 and 92 respectively. With the plunger 94, this may be a cost-effective means to accomplish the braking necessary to hold the tarp in parked position.

An enhanced motor, brake systems, and transmission combination can be used in conjunction with a variety of container covers and side-to-side knuckle arm assemblies, such as on a front side of the reel 32 with a roller or reel as a means to actuate a roll tarp. The arm assembly can allow the cover to be wound upon the reel 32 that moves in an opening direction or in reverse to unwind to close the tarp. Several prior art systems were incorporated by reference above, including a front-to-back system, that may use a spur gear system.

A substitution of a hydraulic brake motor and enhanced transmission may not affect other aspects of the existing tarp structures. The hydraulic driven gear motor with a brake mechanism can be interchanged with certain electric motors. The size and weight are another benefit of the enhanced motor, brake systems, and transmission combination.

This hydraulic device is disclosed for a tarp system for use with an open top container of a trailer or rail car, but the device could be used for operating hopper doors or similar applications that favor use of a brake with a hydraulic motor.

This disclosure has been described as having exemplary embodiments and is intended to cover any variations, uses, or adaptations using its general principles. It is envisioned that those skilled in the art may devise various modifications and equivalents without departing from the spirit and scope of the disclosure as recited in the following claims. Further, this disclosure is intended to cover such variations from the present disclosure as come within the known or customary practice within the art to which it pertains.

What is claimed is:

1. Intended for use with an open top container of a trailer or rail car, a tarp system with a rollable cover movable between a first position and a second position, wherein the cover is attached to and wrappable about a reel, the tarp system comprising:
   the rollable cover adapted to cover contents of the container;
   a moveable arm operably attached to a portion of the container;
   a hydraulic-driven, bi-directional gear motor mounted on the movable arm;
   a hydraulically-operated brake mechanism to lock and hold a position of the motor; wherein the hydraulically-operated brake mechanism is a mechanical lock and hold brake including a hydraulic piston, and
   a transmission having a rolling gear set rotated by the motor and with an output for driving the reel to operate the cover,
   wherein a hydraulic system of the trailer or rail car operates the hydraulic-driven, bi-directional gear motor and the hydraulically-operated brake mechanism.

2. The tarp system of claim 1 wherein the hydraulic driven gear motor is mounted on a distal end of an arm assembly including the moveable arm.

3. The tarp system of claim 1 wherein the rolling gear set includes a spur gear.

4. Intended for use with an open top container of a trailer or rail car, a tarp system with a rollable cover movable between a first position and a second position, wherein the cover is attached to and wrappable about a reel, the tarp system comprising:
   the rollable cover adapted to cover contents of the container;
   a moveable arm operably attached to a portion of the container;
   a hydraulic-driven, bi-directional gear motor mounted on the movable arm;
   a hydraulically-operated brake mechanism to lock and hold a position of the motor; and
   a transmission having a rolling gear set rotated by the with an output for driving the reel to operate the cover,
   wherein the hydraulic-driven, bi-directional gear motor includes a port path for flow of fluid to an internal meshing gear set with a first gear on a primary rotating shaft and a second gear on a secondary shaft, and
   the hydraulically-operated brake mechanism includes a plunger that clamps and holds the internal meshing gear set when hydraulic fluid is not under pressure in the port path, and a disk spring that resiliently engages the plunger.

5. Intended for use with an open top container of a trailer or rail car, a tarp system with a rollable cover movable between an opened position and a closed position, wherein the cover is attached to and wrappable about a reel, the tarp system comprising;
   the rollable cover adapted to cover contents of the container;
   a hydraulic-driven, bi-directional gear motor with a brake mechanism to lock and hold a position of the motor; the brake mechanism including a hydraulic piston that selectively engages a holding brake with a hex connector that mechanically cooperates with a hex-shaped receiver to lock and hold the hydraulic driven gear motor; and
   a transmission having a gear set rotated by the motor and with an output for driving the reel to operate the cover.

6. The tarp system of claim 5 wherein the gear set includes spur gears.

7. The tarp system of claim 5 wherein the motor and brake mechanism weigh less than four pounds.

8. Intended for use with an open top container of a trailer or rail car, a tarp system with a rollable cover movable between an opened position and a closed position, wherein the cover is attached to and wrappable about a reel, the tarp system comprising:
   the rollable cover adapted to cover contents of the container;
   a moveable arm operably attached to a portion of the container;
   a hydraulic gear motor with a port path for flow of hydraulic fluid to an internal meshing gear set with a first gear on a primary rotating shaft and a second gear on a secondary shaft, wherein the primary rotating shaft extends from the hydraulic gear motor;
   a brake system to lock and hold a position of the hydraulic gear motor including a plunger that clamps and holds the internal meshing gear set when hydraulic fluid is not flowing through the port path; and
   a transmission rotated by the primary rotating shaft with an output for driving the reel to operate the cover.

9. The tarp system of claim 8 wherein the secondary shaft and the second gear are completely inside the gear motor.

10. The tarp system of claim 8 wherein the port path allows fluid to enter and exit adjacent to intersections of the first and second gears of the internal meshing gear set.

11. The tarp system of claim 8 further comprising a disk spring that resiliently engages the plunger so that fluid pressure on the plunger from the hydraulic fluid compresses the disk spring to allow the first and second gears to rotate.

* * * * *